Aug. 30, 1960    F. PESCE    2,950,551
LAND RAKES
Filed March 30, 1955    2 Sheets-Sheet 1
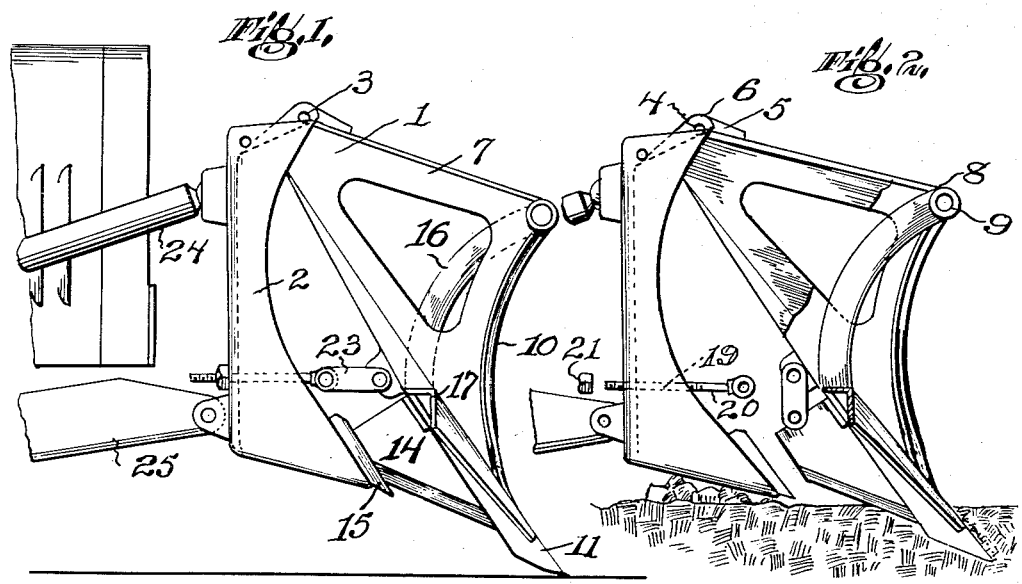
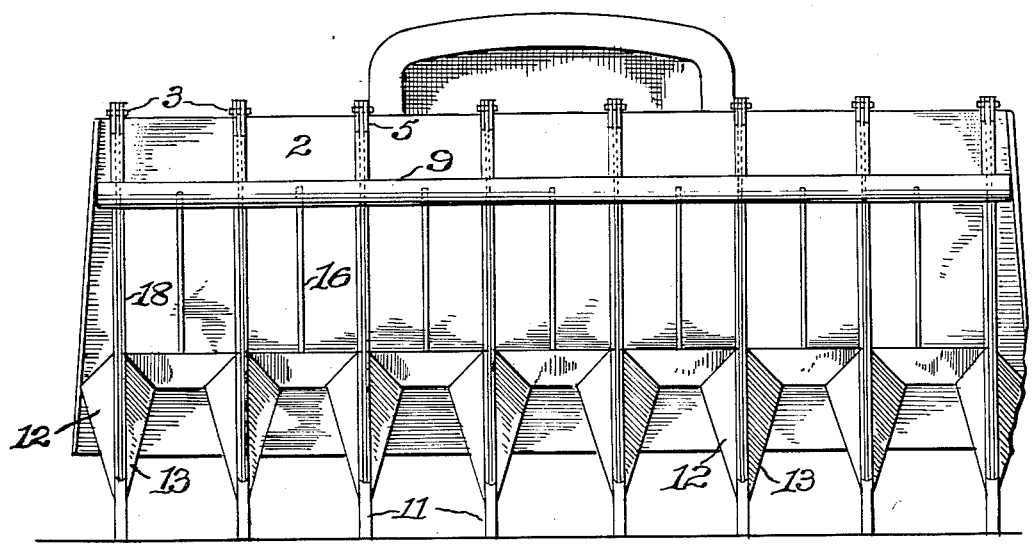
INVENTOR
FRED PESCE
BY Brown & Seward
his ATTORNEYS.

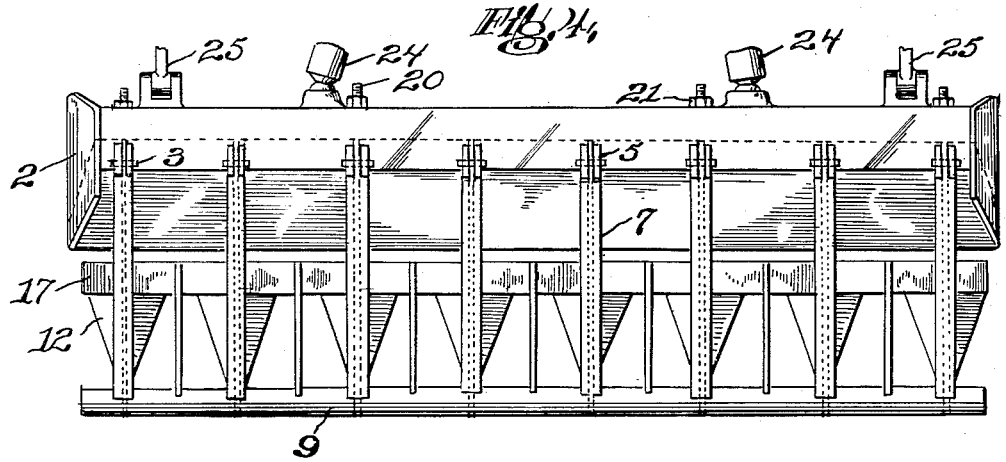
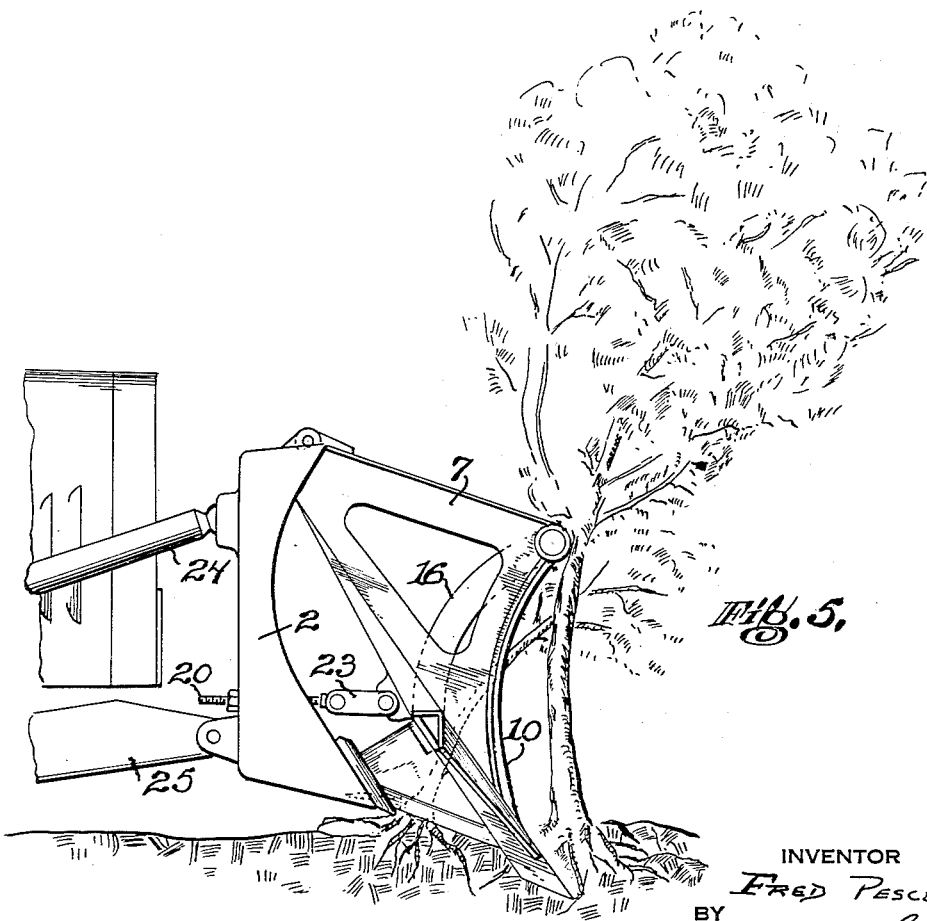

United States Patent Office 2,950,551
Patented Aug. 30, 1960

2,950,551

LAND RAKES

Fred Pesce, R.F.D. 3, Torrington, Conn.

Filed Mar. 30, 1955, Ser. No. 497,859

3 Claims. (Cl. 37—145)

The invention relates to a land rake which may easily be attached to and detached from the blade of a bulldozer, said rake being designed for use in clearing land of rock and roots and for ripping sod.

The object of my invention is to produce an apparatus of the above character, which, in addition to its detachability includes means for bending trees and brush prior to engagement of the latter and uprooting same by specially designed teeth and blade as more fully described below.

Another object is to provide a land rake in which ground engaging teeth, their supporting frame, the brush engaging bar and means for spacing the teeth from the bulldozer blade are all formed in an integral unit adapted to be pivoted at the upper portion of said blade.

Another object is to provide means in a structure of this type for holding the teeth in fixed relation to the blade both during the forward and backward travel of the blade in order that the surface being worked on may be engaged by the fixed teeth regardless of their direction of travel with respect thereto.

Another object is to provide the teeth with relatively sharp upper front and lower back surfaces throughout a predetermined section of their lengths for aiding in the desired ripping operation.

Another object is to provide a land rake in which the teeth are arcuate throughout their length and have arcuate struts therebetween and in parallel longitudinal planes to said teeth.

A still further object is to provide means for casting the frame carrying said teeth and brush engaging bar loose from the lower section of the blade while maintaining the frame in pivoted relationship with the blade top during the "dragging" or reversal of the direction of travel of said blade.

A still further object is to provide an apparatus of the described character whereby the above and other objects as will hereinafter appear may be attained.

Broadly, my invention comprises a land rake, so-called, including a swingable frame pivoted to a bulldozer blade, having a brush engaging bar above ground engaging teeth, with means for holding the frame and its component parts in predetermined relation with said blade.

A practical embodiment of my invention is illustrated in the accompanying drawing in which—

Fig. 1 represents, in side elevation, the preferred embodiment of my invention attached to a bulldozer blade.

Fig. 2 represents, in side elevation, the rake in swingable condition when held on its top pivot only.

Fig. 3 represents a front elevation of the form shown in Fig. 1.

Fig. 4 represents a top plan view of the form shown in Figs. 1 and 3, and

Fig. 5 represents, in side elevation, my invention in position for forward movement.

The drawing illustrates a land rake attached in operative position by pivoting its frame 1 to the usual blade 2 by inserting pins or bolts 3 through the registered holes 4, in elements 5 on frame 1 which elements fit between the ears 6 on blade 2.

Frame 1 extends outwardly from blade 2 as shown in Fig. 1 and is supported by arms which terminate in rod supporting ends 8, said rod being numbered 9. Slanting downwardly are curved supports 10 which are relatively sharp along their forward edges, for reasons to be hereinafter set forth, and which terminate in teeth 11 now to be described.

The lower or terminal ends of teeth 11 are shaped to engage the earth or sod being worked on (not shown) and are usually, but not necessarily, provided with wide side flanges 12, 13. The backs of said teeth are comparably sharp with respect to the front and are spaced from blade 2 by relatively thin fixed elements 14, normally affixed to each tooth in any well known or approved manner, as by welding same thereto, and located to engage a base plate 15 on blade 2 at its lower edge as shown in Fig. 1.

Between said teeth and lying in vertical planes parallel to same are curved members 16, the upper ends of said members being mounted in frame 1 at its outer end adjacent transverse rod 9 and their lower ends being fixed to transverse brace 17 affixed to, and supporting across the rear, all of teeth 11, said brace terminating in the side members 18 of frame land being mounted therein.

The blade 2 is drilled at a plurality of locations, as at 19 to accommodate rods 20 screw threaded at one end to take nuts 21, and terminating in links denoted generally by 23. The latter are fastened into the back of teeth 11 and/or to an appropriate member of the frame 1 such as the transverse brace 17, in order to be in a position to draw the teeth toward the blade until base plate 15 contacts elements 14 as the nuts 21 are set up.

To assemble the land rake the respective parts may be prefabricated and then welded or otherwise fastened together, welding being preferable as it substantially eliminates lost motion between the respective parts. The rake may be attached by running the blade 2 up to the frame 1 so the ears 6 fit elements 5 on the blade so as to take pins or bolts 3 in the alined holes 4, thereby pivoting the land rake to the blade 2 at the top thereof.

In operation, the blade is actuated in the usual manner by its supporting members 24, 25, and the usual tackle (not shown) when the rake is affixed thereto. Unless cast loose to swing on pivots 3, the teeth 11 engage the ground in fixed relation with the blade 2 both when being carried forward or when being drawn backward, thereby carrying out a ripping and/or cutting action in both instances. When the rake is in forward motion small stones will carry up over across brace 17, fall down behind and go under blade 2, whereas brush, trees etc. will be first engaged by cross rod 9, or cross brace 17 bent over, then torn up by teeth 11, and rolled up thereon as well as upon the curved members 16. The teeth will normally continue a ripping action when the machine is reversed, but may be cast loose from the blade by backing off nuts 21 and thus caused to act as a rake only, pivoted at the top of the blade, while the latter may be then lowered and will serve to level off the surface across which it is dragged.

While teeth have been described as of a certain construction, they may be of varying shapes and sizes, including special tips of hardened material, as long as they are properly angled to perform the functions set forth above.

It will be seen from the foregoing that I have provided a rugged and efficient structure of novel construction which is capable of performing its intended functions with a minimum of adjustment as the unitary structure has been designed to cooperate with and complement the usual blade.

Since it is evident that various changes may be made in the construction, form and arrangement of the several parts without departing from the spirit and scope of my invention, I do not intend to be limited to the specific embodiment herein shown and described except as set forth in the appended claims, which are intended to cover all reasonable equivalents of my invention.

What I claim is:

1. A land rake comprising the combination with a movable blade of a swingable frame pivoted thereon, a top frame section extending forwardly from said blade, a transverse brush engaging element mounted in and across the said section at and in its forward ends, a series of ground engaging teeth depending from the outer end of said top frame section and extending below and beyond said transverse element, means attached to said teeth for spacing said teeth from said blade, adjustable means carried by the blade for holding the teeth in such spaced relation and frame sections connecting said teeth with said forward top frame section.

2. A land rake comprising the combination with a movable blade of a set of laterally spaced teeth, a bar located above and across said teeth for engaging and bending brush, a common substantially triangular frame carrying said teeth and bar, said frame being pivoted on said blade, vertical arcuate elements interposed between said teeth and mounted on said common frame for rolling uprooted brush thereon, and means for spacing said teeth from said blade comprising a spacer on the backs of said teeth and at least one releasable element for holding said spacer against said blade interconnected with said blade and spacer.

3. A land rake comprising the combination with a movable blade of a swingable unit mounted at its top on the upper portion of said blade, said unit comprising a substantially triangular frame, a transverse brush engaging bar mounted in the forward upper portion of said frame and a set of spaced arcuate teeth mounted in the lower portion of said frame, said teeth being sharp on their forward longitudinal edges, longitudinal arcuate members spaced from and interposed between said teeth, for engaging uprooted material and means mounted on said movable blade for adjusting the teeth toward and away from said blade at their lower ends, said last named means being operatively mounted in and releasably secured to said blade.

References Cited in the file of this patent

UNITED STATES PATENTS

| | | |
|---|---|---|
| 2,188,435 | Hargrave | Jan. 30, 1940 |
| 2,262,415 | Williams et al. | Nov. 11, 1941 |
| 2,491,058 | Peacock et al. | Dec. 13, 1949 |
| 2,491,208 | Price et al. | Dec. 13, 1949 |
| 2,632,261 | Ferris | Mar. 24, 1953 |
| 2,633,164 | Kissner et al. | Mar. 31, 1953 |
| 2,722,758 | Loftin et al. | Nov. 8, 1955 |